(12) United States Patent
Ross

(10) Patent No.: US 7,699,230 B2
(45) Date of Patent: Apr. 20, 2010

(54) SECURE TAG

(75) Inventor: Gary A. Ross, Edinburgh (GB)

(73) Assignee: NCR Corporation, Dayton, OH (US)

( * ) Notice: Subject to any disclaimer, the term of this patent is extended or adjusted under 35 U.S.C. 154(b) by 863 days.

(21) Appl. No.: 11/301,990

(22) Filed: Dec. 13, 2005

(65) Prior Publication Data
US 2007/0132984 A1 Jun. 14, 2007

(51) Int. Cl.
G06K 19/06 (2006.01)
(52) U.S. Cl. .................. 235/491; 235/487; 235/492
(58) Field of Classification Search .............. 235/491, 235/487; 428/403, 411.1
See application file for complete search history.

(56) References Cited

U.S. PATENT DOCUMENTS 7,129,506 B2 * 10/2006 Ross et al. ................. 250/556

| 2003/0177941 | A1 | 9/2003 | Barbera-Guillem |
| 2004/0031931 | A1 * | 2/2004 | Muller et al. ............ 250/458.1 |
| 2005/0042428 | A1 * | 2/2005 | Dean ........................ 428/195.1 |

FOREIGN PATENT DOCUMENTS

| EP | 1 116 755 A | 7/2001 |
| WO | WO 97/10307 A | 3/1997 |

* cited by examiner

*Primary Examiner*—Seung H Lee
(74) *Attorney, Agent, or Firm*—Christopher P. Ricci

(57) ABSTRACT

A secure tag comprising: a carrier doped with one or more rare earth ions, and a barrier material associated with the carrier and substantially blocking low-wavelength radiation to shield the rare earth ions from low-wavelength radiation. This enables a secure tag to be fabricated that does not photoluminescence strongly in response to a low-wavelength excitation radiation source.

11 Claims, 3 Drawing Sheets

| Excitation (nm) | Luminescence (nm) |
|---|---|
| 395 | 535 |
| | 590.5 |
| | 615 |
| | 654 |
| 415 | 590.5 |
| | 615 |
| 465 | 590.5 |
| | 615 |
| 535 | 615 |

Fig 3

SECURE TAG

BACKGROUND

The present invention relates to improvements in or relating to a secure tag.

Secure tags are used for a number of different purposes. One of the primary uses of a secure tag is to prevent counterfeiting. One type of secure tag that has recently been developed is based on small particles of a rare earth doped host, such as glass. This type of secure tag is described in U.S. patent application No. 2004/0262547, entitled "Security Labelling," and U.S. patent application No. 2005/0143249, entitled "Security Labels which are Difficult to Counterfeit", both of which are incorporated herein by reference. These rare earth doped particles (hereinafter "RE particles") can be applied to valuable items in different ways. For example, the secure tags can be incorporated in fluids which are applied (by printing, spraying, painting, or such like) to valuable items, or incorporated directly into a substrate (paper, rag, plastic, or such like) of the valuable items.

In response to suitable excitation, RE particles produce a luminescence spectrum having narrow peaks because of the atomic (rather than molecular) transitions involved. Known readers for RE particles include (i) a suitable excitation source to stimulate transitions in the secure tag, and (ii) a detector to measure the luminescence emitted in response to the excitation.

The suitable excitation source may be tuned (in the sense that the excitation is selected to optimize luminescence from one or more transitions in the rare earth ions), or high frequency (to stimulate all, or at least many, transitions in the rare earth ions and the host).

Tuned excitation is usually achieved using a narrowband source, such as an LED, in the visible region of the electromagnetic spectrum. High frequency excitation may be achieved using a broadband source having a high intensity contribution from the ultra-violet or low-wavelength visible (for example, between 350 nm and 400 nm) portion of the electromagnetic spectrum. Alternatively, high frequency excitation may be achieved using a narrowband source emitting in the ultra-violet or low-wavelength visible portion (for example, at 395 nm) of the electromagnetic spectrum.

One disadvantage of the RE particles being responsive to excitation from a high frequency source is that low-cost ultra-violet radiation excitation sources may be used for all types of RE particles, rather than having to use a different selective excitation source for each type of RE particle. This may reduce the security of the secure tags.

SUMMARY

According to a first aspect of the invention there is provided a secure tag comprising: a carrier doped with one or more rare earth ions, and a barrier material associated with the carrier and substantially blocking low-wavelength radiation to shield the rare earth ions from low-wavelength radiation.

In many applications of this aspect of the invention, multiple secure tags of the same type may be used together to ensure that a strong luminescence signal can be obtained from the secure tags. The secure tags may be applied as a relatively dense coating in a secure tag area.

The barrier material may be in the form of a highly reflective and/or scattering material, such as titanium dioxide or zinc oxide. Titanium dioxide blocks UVB (280 nm to 320 nm) primarily by absorption, and blocks UVA (320 nm to 390 nm) primarily by scattering.

Alternatively, or additionally, the barrier material may have a high coefficient of absorption for radiation between 10 nm and 400 nm, particularly for radiation between 300 nm and 400 nm. Preferably, the coefficient of absorption for wavelengths between 300 nm and 400 nm is above 0.6, more preferably above 0.7, advantageously above 0.8. It is also preferable to have a coefficient of absorption of less than 0.4 (advantageously less than 0.2) for wavelengths above 450 nm, and a coefficient of absorption of less than 0.2 (advantageously less than 0,1) for wavelengths above 500 nm.

An ideal barrier material would have characteristics similar to a bandpass filter that blocks all radiation having a wavelength between 300 nm and 450 nm, and allows all radiation above 450 nm to pass through.

The barrier material may encapsulate the doped carrier, for example, using microencapsulation techniques. Micro-encapsulation is a well known technique; one example is given in U.S. Pat. No. 6,905,766 entitled "Encapsulation of discrete quanta of fluorescent particles". Microencapsulating the secure tags ensures that little (or perhaps no) low-wavelength radiation reaches the rare earth ions to stimulate emission therefrom. Alternatively, the barrier material may be distributed throughout the secure tag.

The carrier may comprise a glass, such as borosilicate glass. Alternatively, the carrier may comprise a polymer.

The barrier material may comprise a UV absorbing substance such as those substances used in coatings applied to sunglasses. One suitable substance is described in U.S. Pat. No. 5,949,518 entitled "Color-neutral UV blocking coating for plastic lens" incorporated herein by reference. Such substances may be used to microencapsulate the secure tags. Other well-known UV absorbing substances include cerium, polyimide, and other polycarbonates.

The barrier material may be included in a liquid in which the secure tag is suspended. In such embodiments, the barrier material may include common sunscreen additives. Sunscreen additives that absorb both UVA and UVB radiation include: avobenzone, Menthyl anthranilate, A&B oxybenzone (Benzophenones), Homosalate, Dioxybenzone, Sulisobenzone, and Trolame Salicylate. Sunscreen additives that absorb primarily UVB radiation include: Octocrylene, PABA (para-aminobenzoic acid), Padimate-O (Octyl dimethyl paba), Cinnamates, and Cinoxate.

By virtue of this aspect of the invention, a secure tag is provided that shields rare earth ions within the tag from low-wavelength radiation. This ensures that a low-wavelength radiation source cannot be used to excite all transitions in the secure tag, and requires a higher wavelength excitation source (for example 500 nm) to selectively excite one or more transitions, thereby increasing the security of the secure tag.

According to a second aspect of the invention there is provided a secure tag comprising: a carrier doped with one or more rare earth ions, the carrier having barrier properties, including a high coefficient of absorption for low-wavelength radiation.

According to a third aspect of the invention there is provided a method of manufacturing a secure tag comprising a carrier doped with one or more rare earth ions, the method comprising: (i) ascertaining an excitation radiation wavelength that stimulates a plurality of transitions within the doped carrier; (ii) selecting an additive having a higher absorption coefficient at the ascertained excitation radiation wavelength than the carrier or the rare earth ions; and (iii) manufacturing a secure tag incorporating the selected additive.

The step of ascertaining an excitation radiation wavelength may include ascertaining an excitation radiation wavelength that would stimulate the highest number and/or the strongest transitions within the secure tag. This enables the barrier material to be chosen with a view to ensuring certain transitions are not stimulated by a UV excitation source.

The step of manufacturing a secure tag incorporating the selected additive may comprise encapsulating the doped carrier in the selected additive. Alternatively, the step of manufacturing a secure tag incorporating the selected additive may comprise including the additive as part of starting ingredients for the secure tag.

These and other aspects of the present invention will be apparent from the following specific description, given by way of example, with reference to the following drawings.

BRIEF DESCRIPTION OF THE DRAWINGS

FIG. 3 is a table illustrating the luminescence peaks from a secure tag in response to different excitation wavelengths.

DETAILED DESCRIPTION

Figure 1:
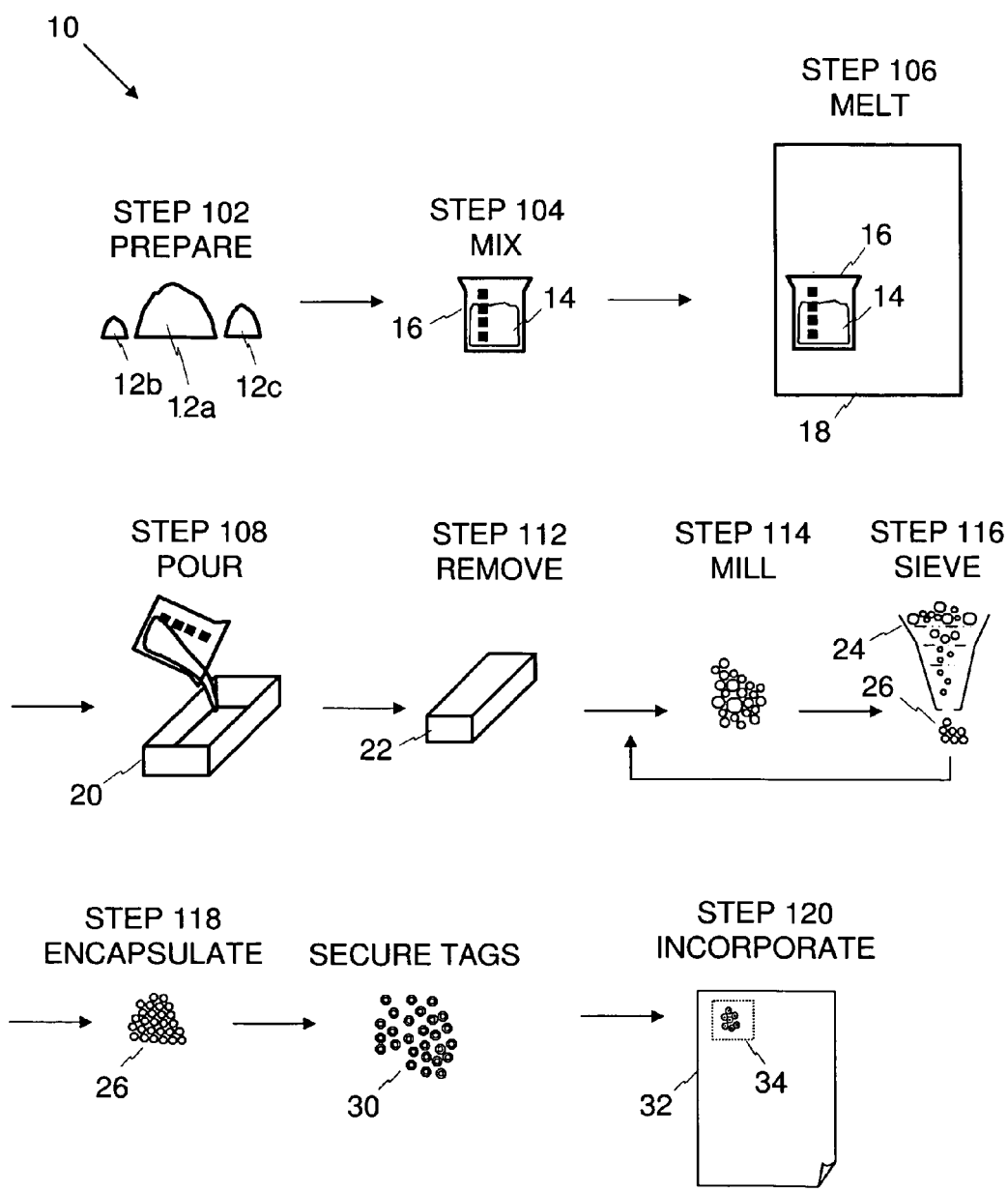
FIG. 1 is a schematic diagram illustrating manufacture of a secure tag according to one embodiment of the present invention.
Figure 2:
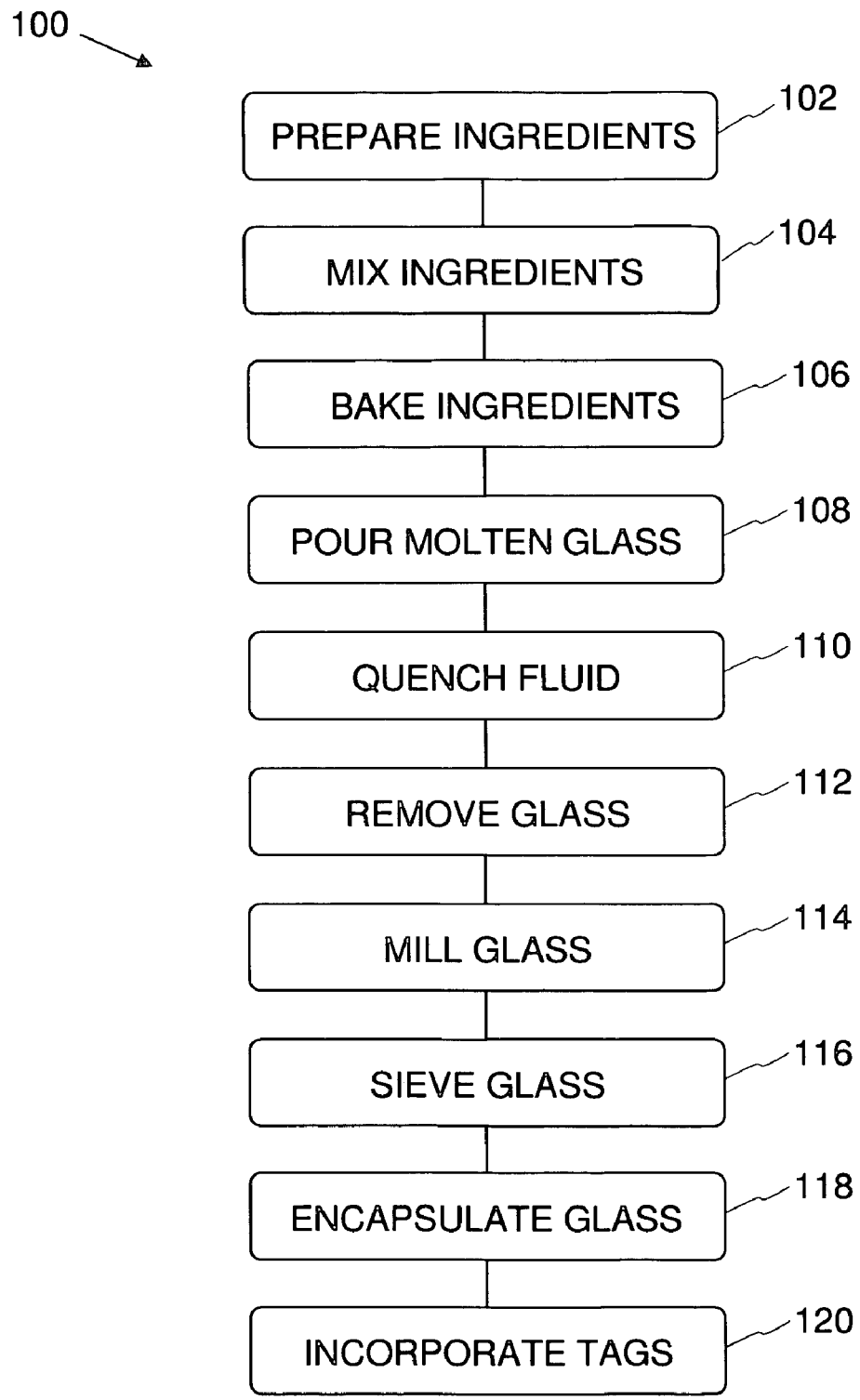
FIG. 2 is a flowchart describing steps involved in the manufacture of the secure tag of FIG. 1.

Reference is first made to FIG. 1, which is a schematic diagram of process 10 for manufacturing a secure tag according to one embodiment of the present invention. Reference is also made to FIG. 2, which is a flowchart 100 describing the steps involved in the manufacturing process 10.

The process 10 is based on the melt and quench technique for glass production. The process 10 starts with preparing starting ingredients 12 (step 102).

In this example, 3 mol % of Europium doped borosilicate glass is to be manufactured as a secure tag. The starting ingredients 12 for this secure tag are: $SiO_2$ 51.79 wt %; NaO 9.79 wt %; CaO 7.00 wt %; MgO 2.36 wt %; $Al_2O_3$ 0.29 wt %; FeO, $Fe_2O_3$ 0.14 wt %; $K_2O$ 0.07 wt %, $B_2O_3$ 28.56 wt %, and 3 mol % of $EuCl_3$. These ingredients are found in soda lime beads 12a, $B_2O_3$ 12b, and 3 mol % of $EuCl_3$ 12c, all in powder form.

The starting ingredients 12 are then mixed (step 104), so that 5 g of the powdered soda lime beads, 2 g of the $B_2O_3$ and 3 mol % of $EuCl_3$, are ball milled together for a period of time (for example 3 minutes) to produce a finely mixed powder 14.

The finely mixed powder 14 is then melted (step 106) into a glass by baking in a platinum crucible 16 in a furnace 18. The finely mixed powder 14 is first heated to 550 C, left in the furnace at this temperature for approximately 30 minutes to ensure that the boric oxide ($B_2O_3$) is completely melted. The furnace temperature is then increased to 1100 C for approximately 1 hour to produce a homogeneous melt. The temperature is again increased, this time to 1250 C.

The next step (step 108) is to pour the molten glass into a brass mould 20 maintained at room temperature. This quenches (step 110) the glass to form a transparent, bubble free ingot 22 of borosilicate glass, doped with rare earth ions. The ingot 22 is then removed (step 112) from the mould 20.

The ingot 22 is then iteratively ball milled (step 114) and sieved (step 116) in a sonic sifter 24 to produce homogenous, small particles 26 (typically of 5 micron diameter) of Europium doped borosilicate glass.

The next step is to encapsulate (step 118) the small particles 26 in a barrier material 28 to create a secure tag 30 that shields the particles 26 from low wavelength radiation.

The barrier material 28 used in this embodiment comprises polyimide, which is dissolved in tetrahydrofuran (THF). When applied to the beads the solution is heated to drive off the solvent and cross-link the polyimide for the purpose of encapsulating individual particles 26.

Once the small particles 26 are encapsulated, they become secure tags 30. The secure tags 30 are applied to a document 32 (step 120) as a relatively dense coating in a secure tag area 34 of the document 32. This enables the document 32 to be validated either by detecting the presence of the secure tags 30, if high security is not required; or by measuring the response of the secure tags 30 to excitation, if high security is required.

Measuring the response of the secure tags 30 to excitation can be achieved by a two-step process, and will be described with reference to FIG. 3, which is a table showing the photoluminescence peaks for each of four different excitation wavelengths (395 nm, 415 nm, 465 nm, and 535 nm). The photoluminescence peaks resulting from excitation at a particular wavelength can be ascertained prior to deciding which barrier material to use.

The first step is to excite the secure tag area 34 with a UV source (corresponding to the 395 nm excitation in FIG. 3), to measure the luminescence in response to the excitation, and to verify that the luminescence measured at 615 nm is relatively weak.

The second step is to excite the secure tag area 34 with a source radiating at 465 nm, to measure the luminescence in response to the excitation, and to verify that the luminescence measured at 615 nm is relatively strong.

It will now be appreciated that a high energy excitation source (such as a 395 nm source) will not stimulate strong luminescence from the secure tag area 34 because the secure tags 30 block the UV excitation due to the presence of the barrier material 28.

Various modifications may be made to the above-described embodiments within the scope of the present invention, for example, in other embodiments, a different barrier material may be used.

In one embodiment, small particles of titanium dioxide and/or zinc oxide may be used as the barrier material. The smaller the primary particle size of the titanium dioxide or zinc oxide the greater the transparency.

In other embodiments, the secure tags 30 may be used individually, may be suspended in a fluid, may be incorporated in a substrate other than a document, or such like.

In the above embodiment, the barrier material is dissolved in tetrahydrofuran (THF); whereas, in other embodiments, a polyimide barrier material may be dissolved in another suitable organic solvent.

In other embodiments, a combination of rare earth ions may be used in a secure tag. This combination may or may not include Europium.

In other embodiments, the secure tag may incorporate ions different to rare earth ions.

What is claimed is:

1. secure tag comprising: a carrier doped with one or more rare earth ions, and a barrier material associated with the carrier and substantially blocking low-wavelength radiation to shield the rare earth ions from low-wavelength radiation, wherein low wavelength radiation comprises radiation having a wavelength of 450 nm or less, the barrier material comprises polyimide, which is dissolved in tetrahydrofuran.

2. A secure tag according to claim 1, wherein the barrier material is a highly reflective and/or scattering material.

3. A secure tag according to claim 1, wherein the barrier material has a high absorptivity in the ultra-violet region of the electromagnetic spectrum and a low absorptivity in the visible region of the electromagnetic spectrum.

4. A secure tag according to claim 1, wherein the barrier material microencapsulates the doped carrier.

5. A secure tag according to claim 1, wherein the carrier comprises a glass.

6. A secure tag according to claim 1, wherein the barrier material is included in a liquid in which the secure tag is suspended.

7. A secure tag comprising: a carrier doped with one or more rare earth ions, the doped carrier being microencapsulated by a barrier material having a coefficient of absorption above 6.0 for radiation having a wavelength of 450 nm or less.

8. A method of manufacturing a secure tag comprising a carrier doped with one or more rare earth ions, the method comprising: (i) ascertaining an excitation radiation wavelength that stimulates a plurality of transitions within the doped carrier; (ii) selecting an additive having a higher absorption coefficient at the ascertained excitation radiation wavelength than the carrier or the rare earth ions; and (iii) manufacturing a secure tag incorporating the selected additive by microencapsulating the doped carrier with the selective additive to ensure that little to no low-wavelength radiation reaches the rare earth ions to stimulate emission there from, the selective additive is a barrier material comprising an ultraviolet absorbing substance.

9. A method according to claim 8, wherein ascertaining an excitation radiation wavelength includes ascertaining an excitation radiation wavelength that would stimulate the highest number of transitions within the secure tag.

10. A method according to claim 8, wherein manufacturing a secure tag incorporating the selected additive comprises encapsulating the doped carrier in the selected additive.

11. A method according to claim 8, wherein manufacturing a secure tag incorporating the selected additive comprises including the additive as part of starting ingredients for the secure tag.

* * * * *